United States Patent [19]

Hayashi et al.

[11] Patent Number: 5,745,457
[45] Date of Patent: Apr. 28, 1998

[54] OPTICAL DISK PLAYER WITH COARSE AND FINE SPEED CONTROL

[75] Inventors: Hideki Hayashi; Hideki Kobayashi, both of Tsurugashima, Japan

[73] Assignee: Pioneer Electronic Corporation, Tokyo, Japan

[21] Appl. No.: 606,993

[22] Filed: Feb. 26, 1996

[30] Foreign Application Priority Data

Feb. 28, 1995 [JP] Japan .................. 7-039555

[51] Int. Cl.[6] .................................................. G11B 7/00
[52] U.S. Cl. .................................................. 369/50; 369/54
[58] Field of Search .................. 369/47, 50, 54, 369/58

[56] References Cited

U.S. PATENT DOCUMENTS 4,853,914  8/1989  Okano et al. .................. 369/50 X
4,855,847  8/1989  Kanamaru .................. 369/50 X
5,200,944  4/1993  Souma .................. 369/50 X
5,313,443  5/1994  Iitsuka .................. 369/50

*Primary Examiner*—W. R. Young
*Attorney, Agent, or Firm*—Evenson, McKeown, Edwards & Lenahan, PLLC

[57] ABSTRACT

An optical disk player utilizes an analog read signal generated from a pickup. The analog read signal is converted to a digital read signal consisting of a plurality of bits in synchronism with a sampling clock in an A/D converter. The digital read signal is then decoded in a decoder and decoded data are generated. An error signal according to the difference between an actual rotational speed of the optical disk and a specified speed is generated on the basis of the digital read signal generated from the A/D converter or the decoded data generated from the decoder. And a rotational speed of a spindle motor is controlled in accordance with the error signal.

8 Claims, 8 Drawing Sheets

OPTICAL DISK PLAYER WITH COARSE AND FINE SPEED CONTROL

BACKGROUND OF THE INVENTION

1. Field of the Invention

The present invention relates to an optical disk player for reading data recorded on an optical disk and reproducing information signals such as an image signal and an audio signal from the read data.

2. Description of Related Art

In a player for reproducing recorded information from a conventional optical disk such as a CD (compact disc) on which digital data has been recorded, a rotational speed of a spindle motor for rotating the optical disk is controlled by a spindle servo so that a rotational speed of the optical disk is set to a specified speed (constant linear velocity in the case of the CD). According to the spindle servo, an analog signal read from the optical disk by a pickup is converted into a binary signal of "1" or "0" on the basis of a predetermined threshold value, a signal indicative of an actual rotational speed of the optical disk is obtained from the binary signal, an error signal indicative of the difference between the actual rotational speed and the specified speed is formed, and the spindle motor is driven in accordance with the error signal.

In a player for reproducing a recording signal from the optical disk on which the signal has been recorded at a higher density than that of the conventional optical disk such as a CD, however, since an amplitude of a high frequency component of the analog signal which was read by the pickup is small, even if a binary signal is obtained from the read analog signal on the basis of the predetermined threshold value, the obtained binary signal is not accurately converted to a binary signal recorded on the optical disk. This, consequently, causes a problem in that the rotational speed of the optical disk cannot be controlled to the specified speed at a high precision.

SUMMARY OF THE INVENTION

An object of the invention is to provide an optical disk player which can control a rotational speed of an optical disk which was recorded at a high density to a specified speed at a high precision.

According to the present invention, there is provided an optical disk player for reading data recorded on an optical disk and obtaining a reproduced signal comprising a spindle motor for rotating the optical disk; and pickup means for irradiating a light beam toward a recording surface of the optical disk, receiving a light reflected from the optical disk, and generating an analog read signal according to the amount of the received light. The optical disk player also includes A/D converting means for converting the read signal to a digital read signal consisting of a plurality of bits in synchronism with a sampling clock decoding means for decoding the digital read signal and generating decoded data error signal generating means for generating an error signal according to the difference between an actual rotational speed of the optical disk and a specified speed on the basis of the digital read signal, and means for controlling a rotational speed of the spindle motor in accordance with the error signal.

Further, according to the present invention, there is also provided an optical disk player for reading data recorded on an optical disk and reproducing, comprising a spindle motor for rotating the optical disk and pickup means for irradiating a light beam toward a recording surface of the optical disk, receiving a light reflected from the optical disk, and generating an analog read signal according to the amount of the received light. This disk player also includes A/D converting means for converting the read signal to a digital read signal consisting of a plurality of bits in synchronism with a sampling clock. decoding means for decoding the digital read signal and generating decoded data, error signal generating means for generating an error signal according to the difference between an actual rotational speed of the optical disk and a specified speed on the basis of the decoded data. and means for controlling a rotational speed of the spindle motor in accordance with the error signal.

According to the present invention, after the analog read signal generated from the pickup is converted to the digital read signal consisting of the plurality of bits in synchronism with the sampling clock in the A/D converting means. the digital read signal is decoded in the decoding means. and the decoded data is generated. The error signal according to the difference between the actual rotational speed of the optical disk and the specified speed is generated on the basis of the digital read signal generated from the A/D converting means or the decoded data generated from the decoding means. The rotational speed of the spindle motor is controlled in accordance with the error signal.

DETAILED DESCRIPTION OF THE PREFERRED EMBODIMENTS

Embodiments of the present invention will now be described in detail hereinbelow with reference to the drawings.

Figure 1:
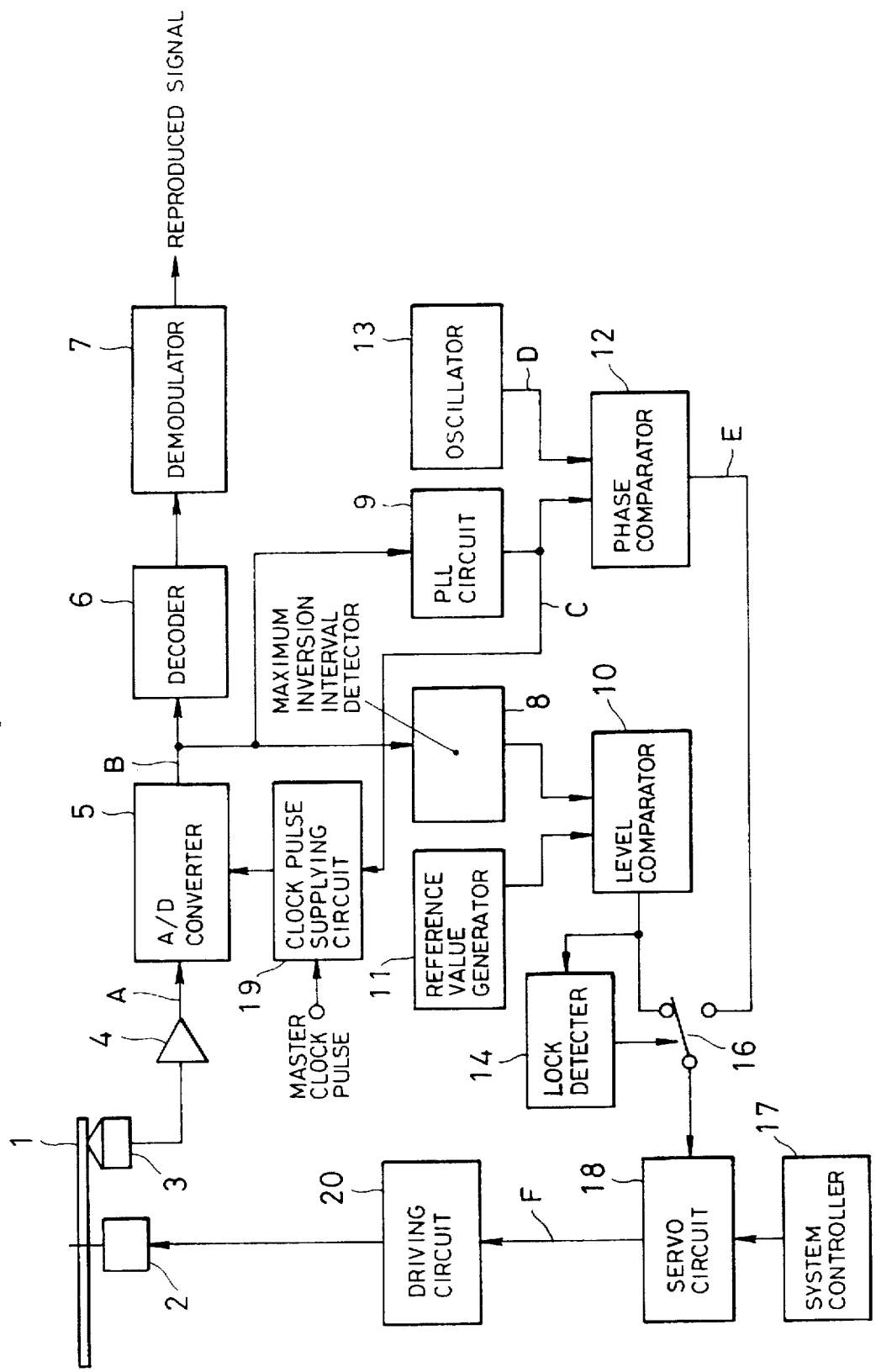
FIG. 1 is a block diagram showing the first embodiment of the invention.

FIG. 1 shows an optical disk player as an embodiment of the present invention. On a discoidal optical disk 1 set in the optical disk player, a recording signal as digital data such as audio data has been recorded as a pit train along spiral or concentrical tracks. The optical disk 1 is rotated by a spindle motor 2 and the digital data recorded on the optical disk 1 is optically read by a pickup 3. A read signal as an RF (Radio Frequency) signal generated from the pickup 3 is an analog signal indicative of a received light amount of a light which is reflected from the optical disk 1 by a light beam irradiated from the pickup 3. The read signal is amplified in an RF amplifier 4, being converted to a digital signal in an A/D converter 5. A sampling clock pulse is supplied from a clock pulse supplying circuit 19 to the A/D converter 5. The A/D converter 5 generates a sample value of the read signal in synchronism with the sampling clock pulse. The digitized read signal is supplied to a decoder 6.

The decoder 6 is, for example, a Viterbi decoder and calculates a branch metric and a path metric on the basis of the sample values which are sequentially supplied from the A/D converter 5 and each of a plurality of prediction sample values, thereby decoding a data sequence in which the square error is minimum for an input sequence as decoded data corresponding to the recording signal. By executing the Viterbi decoding, the read signal is accurately converted into a binary signal even when an S/N ratio of the read signal is low. An output signal of the decoder 6 is, for example, EFM (Eight to Fourteen Modulation) demodulated in a demodulator 7 located at the next stage and becomes a reproduced signal.

A maximum inversion interval detector 8 and a PLL (Phase-Locked Loop) circuit 9 are connected to the output of the A/D converter 5. The maximum inversion interval detector 8 detects the maximum inversion interval from the sample values each of which is in turn supplied from the A/D converter 5. That is, a continuation period when the sample value is equal to or larger than a predetermined value or a continuation period when the sample value is equal to or less than the predetermined value is counted as a time duration by using a time counter (not shown). The maximum inversion interval detector 8 holds and outputs the maximum value, the output being reset after the elapse of a predetermined time. The output signal of the maximum inversion interval detector 8 becomes the maximum inversion interval signal showing a time duration of the detected maximum inversion interval and is changed in accordance with the rotational speed of the spindle motor 2. The output signal of the maximum inversion interval detector 8 is supplied to a level comparator 10. A reference value generator 11 for generating a reference value signal is connected to the comparator 10. The comparator 10 compares the level of the maximum inversion interval signal and that of the reference value signal. The reference value signal is a signal indicative of the time duration of the maximum inversion interval when the rotational speed of the spindle motor 2 is equal to the specified speed. An output signal of the comparator 10 becomes an error signal indicative of an error of the rotational speed of the spindle motor 2. The error signal is now called a coarse adjustment speed error signal. A lock detector 14 for generating a lock signal when the coarse adjustment speed error signal level is equal to less than a first predetermined value is connected to the comparator 10. The lock signal is supplied to a change-over switch 16.

The PLL circuit 9 detects a slope portion of the read signal waveform and generates the clock pulse of which phase is synchronized with that of the read signal on the basis of the sample value in the slope portion. The structure and operation of the PLL circuit 9 are disclosed in JP-A-6-231547. The clock pulse is supplied to the clock pulse supplying circuit 19 and to a phase comparator 12. An oscillator 13 for generating a reference clock pulse is connected to the phase comparator 12. The phase comparator 12 generates an error signal indicative of the phase difference between the clock pulse from the PLL circuit 9 and the reference clock pulse. The error signal is now called a fine adjustment speed error signal.

The comparators 10 and 12 are connected to the change-over switch 16. The change-over switch 16 selectively relays and supplies one of the coarse adjustment speed error signal and the fine adjustment speed error signal to a servo circuit 18 in accordance with the output signal of the lock detector 14. The servo circuit 18 generates a control voltage so as to reduce the coarse adjustment speed error signal or the fine adjustment speed error signal which is supplied. The control voltage is supplied to a driving circuit 20 for the spindle motor 2.

The clock pulse supplying circuit 19 supplies a master clock pulse as a sampling clock pulse to the A/D converter 5 when the frequency of the clock pulse from the PLL circuit 9 is not included in a predetermined frequency range. The clock pulse supplying circuit 19 supplies the clock pulse from the PLL circuit 9 as a sampling clock in place of the master clock pulse to the A/D converter 5 when the frequency of the clock pulse from the PLL circuit 9 lies within the predetermined frequency range.

In the structure of the optical disk player according to the present invention, the servo circuit 18 generates a control voltage to the driving circuit 20 so as to start the rotation of the spindle motor 2 in accordance with a driving start command from a system controller 17. The driving circuit 20 consequently starts the rotation of the spindle motor 2. The optical disk 1 is interlocked and rotated by the rotation of the spindle motor 2 and the pickup 3 reads the recording signal of the optical disk 1. The read signal is amplified in the RF amplifier 4 and is supplied to the A/D converter 5. In an initial state just after the start of the rotation of the spindle motor 2, the master clock pulse is supplied from the clock pulse supplying circuit 19 to the A/D converter 5 and the A/D converter 5 generates a digital sample value of the read signal in accordance with a generation timing of the master clock pulse. The sample value is judged as a value of "1" or "0" for every sample value in the decoder 6 in accordance with the Viterbi decoding method and, after that, it is supplied to the demodulator 7.

When the maximum inversion interval is detected from the sample values each of which is in turn supplied from the A/D converter 5, the maximum inversion interval detector 8 generates a maximum inversion interval signal indicative of a time duration of the maximum inversion interval. The maximum inversion interval signal is compared with the reference value signal generated from the reference value generator 11 in the comparator 10. The level difference between the maximum inversion interval signal and the reference value signal is a coarse adjustment speed error signal. This signal is supplied from the comparator 10 to the servo circuit 18 through the change-over switch 16. The servo circuit 18 adjusts the control voltage so that the level of the coarse adjustment speed error signal is equal to 0 and supplies the adjusted voltage to the driving circuit 20. The driving circuit 20 drives so as to increase the rotational speed of the spindle motor 2 when the control voltage is higher than 0V and to decrease the rotational speed of the spindle motor 2 when the control voltage is less than 0V. In the initial state, the rotational speed of the spindle motor 2 is consequently controlled by a feedback path including the maximum inversion interval detector 8 and comparator 10.

On the other hand, the PLL circuit 9 detects a slope waveform portion of the read signal from the sample values of the read signal each of which is in turn generated from the A/D converter 5 and generates a clock pulse of which phase is synchronized with that of the read signal on the basis of the sample values in the slope portion. The clock pulse is supplied to the clock pulse supplying circuit 19. As mentioned above, the master clock pulse is supplied from the clock pulse supplying circuit 19 to the A/D converter 5 just after the start of the rotation of the spindle motor 2 when the generation frequency is not included in a predetermined frequency range. When the frequency of the clock pulse from the PLL circuit 9 lies within the predetermined frequency range, the output clock pulse of the PLL circuit 9 is supplied from the clock pulse supplying circuit 19 to the A/D converter 5 in place of the master clock pulse. The A/D converter 5 consequently generates the digital sample value of the read signal in accordance with the generation timing of the output clock pulse of the PLL circuit 9.

The phase of the output clock pulse of the PLL circuit 9 and that of the reference clock pulse generated from the oscillator 13 are compared in the phase comparator 12. The fine adjustment speed error signal as a result of the phase comparison is supplied to the change-over switch 16. In the initial state just after the start of the rotation of the spindle motor 2, however, since the rotational speed of the spindle motor 2 is controlled in accordance with the coarse adjustment speed error signal generated from the comparator 10, the fine adjustment speed error signal is not used.

After the start of the rotation of the spindle motor 2, when the rotation of the spindle motor 2 is stabilized, the coarse adjustment speed error signal level decreases. When the coarse adjustment speed error signal level lies within a first predetermined value, a lock signal is generated from the lock detector 14. The change-over switch 16 is switched so as to relay the fine adjustment speed error signal from the comparator 12 in place of the coarse adjustment speed error signal in accordance with the lock signal and the fine adjustment speed error signal is supplied to the servo circuit 18. The servo circuit 18 adjusts the control voltage so that the level of the fine adjustment speed error signal is equal to zero and supplies it to the driving circuit 20 of the spindle motor 2. The rotational speed of the spindle motor 2 is, consequently, controlled at a high precision by the feedback path including the PLL circuit 9 and comparator 12 in the generating state of the lock signal.

Figure 2A:
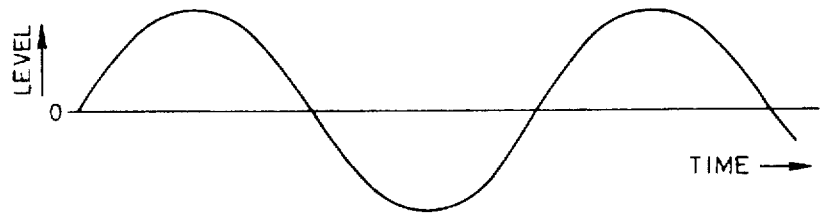
FIGS. 2A to 2F are diagrams showing operation waveforms of respective sections at the time of a rotational speed control when a rotational speed is slower than a specified speed.
Figure 2B:
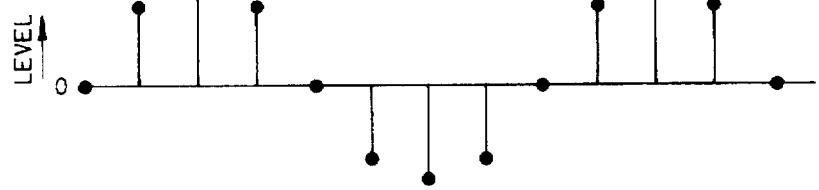
Figure 2C:
Figure 2D:
Figure 2E:
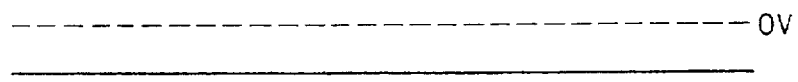
Figure 2F:
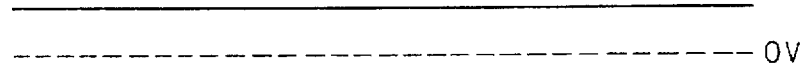
Figure 3A:
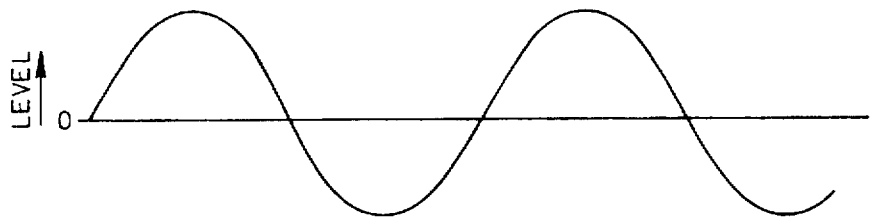
FIGS. 3A to 3F are diagrams showing operation waveforms of the respective sections at the time of a rotational speed control when the rotational speed is equal to the specified speed.
Figure 3B:
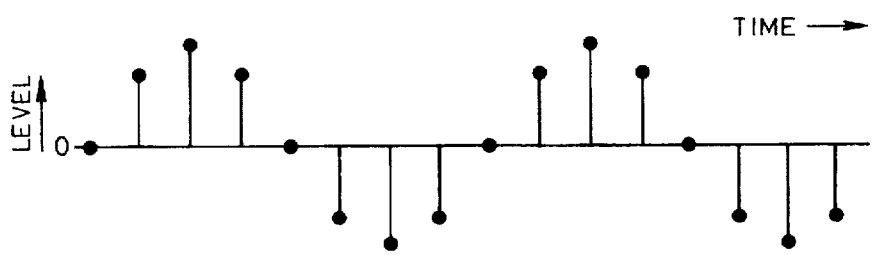
Figure 3C:
Figure 3D:
Figure 3E:
Figure 3F:
Figure 4A:
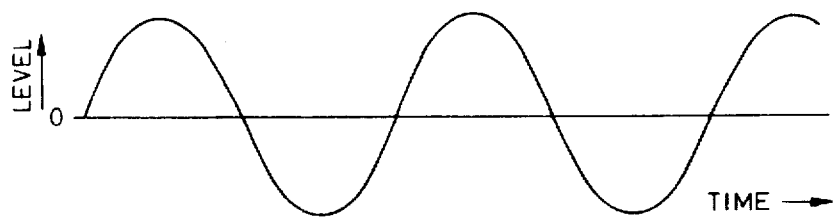
FIGS. 4A to 4F are diagrams showing operation waveforms of the respective sections at the time of a rotational speed control when the rotational speed is faster than the specified speed.
Figure 4B:
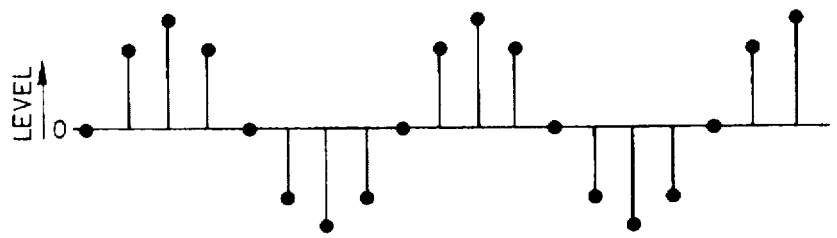
Figure 4C:
Figure 4D:
Figure 4E:
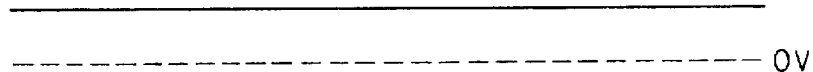
Figure 4F:
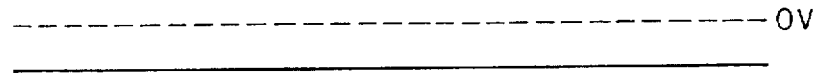

FIGS. 2A to 2F, 3A to 3F, and 4A to 4F show operation waveforms of sections (A) to (F) in FIG. 1 at the time of the rotational speed control in the generating state of the lock signal. FIGS. 2A to 2F show the operation waveforms when the rotational speed is slower than the specified speed. FIGS. 3A to 3F show the operation waveforms when the rotational speed is equal to the specified speed. FIGS. 4A to 4F show the operation waveforms when the rotational speed is faster than the specified speed. FIGS. 2A, 3A, and 4A respectively show read signal waveforms generated from the pickup 3. FIGS. 2B, 3B, and 4B show sample values of the read signals obtained by sampling in the A/D converter 5. FIGS. 2C, 3C, and 4C show clock pulses generated from the PLL circuit 9, each of the clock pulses coincides with the sampling timing, and its frequency is changed in accordance with the rotational speed of the disk 1. FIGS. 2D, 3D, and 4D show reference clock pulses. In the case of FIGS. 2A to 2F, since the rotational speed is slower than the specified speed, the pulse width of the clock pulse generated from the PLL circuit 9 is wider than that of the reference clock pulse. A negative fine adjustment speed error signal as shown in FIG. 2E is consequently generated and the control voltage generated from the servo circuit 18 becomes a positive voltage as shown in FIG. 2F. In the case of FIGS. 3A to 3F, since the rotational speed coincides with the specified speed, the reference clock pulse and the clock pulse generated from the PLL circuit 9 are generated at the same time, and the pulse width of the reference clock pulse and that of the clock pulse generated from the PLL circuit 9 are equal, so that the fine adjustment speed error signal level is equal to zero as shown in FIG. 3E and the control voltage generated from the servo circuit 18 is equal to 0V as shown in FIG. 3F. In the case of FIGS. 4A to 4F, since the rotational speed is faster than the specified speed, the pulse width of the clock pulse generated from the PLL circuit 9 is narrower than that of the reference clock pulse, the positive fine adjustment speed error signal is consequently generated as shown in FIG. 4E and the control voltage generated from the servo circuit 18 becomes a negative voltage as shown in FIG. 4F.

Figure 5:
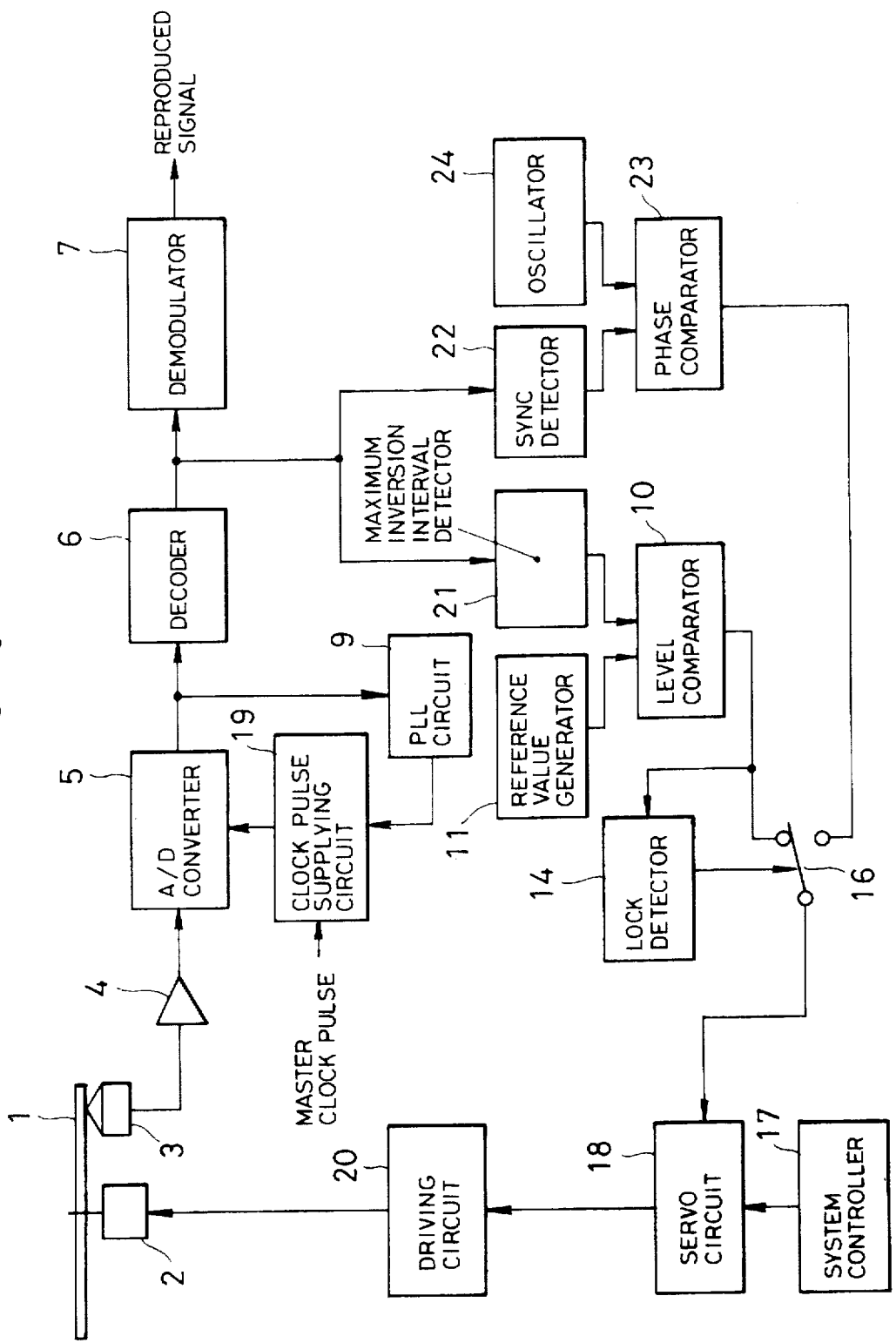
FIG. 5 is a block diagram showing the second embodiment of the invention.

FIG. 5 shows a second embodiment of the present invention. In this embodiment, portions similar to those in the construction shown in FIG. 1 are designated by the same reference numerals. A maximum inversion interval detector 21 is connected to the output of the decoder 6. The maximum inversion interval detector 21 detects a maximum inversion interval from the signal generated from the decoder 6. That is, since the sample values each of which is in turn generated from the A/D converter 5 are converted to values shown by "0" or "1" in the decoder 6, a continuation period of "0" or a continuation period of "1" is counted as a time duration by using a time counter (not shown), the maximum value is held and generated, and the output is reset after the elapse of a predetermined period. An output signal of the maximum inversion interval detector 21 becomes a maximum inversion interval signal indicative of a time duration of the detected maximum inversion interval and changes in accordance with the rotational speed of the spindle motor 2. The output signal of the maximum inversion interval detector 21 is supplied to the comparator 10 and the maximum inversion interval signal is compared with the reference value signal generated from the reference value generator 11 in the comparator 10.

A sync detector 22 is also connected to the output of the decoder 6. In a manner similar to the operation of the maximum inversion interval detector 21, the sync detector 22 detects a sync signal having the maximum inversion interval repeatedly recorded every frame from the output signal of the decoder 6 and generates a sync detection pulse when the sync signal is detected. The sync detection pulse is supplied to a phase comparator 23. An oscillator 24 for generating a reference sync pulse is connected to the phase comparator 23. The phase comparator 23 generates an error signal indicative of the phase difference between the sync detection pulse from the sync detector 22 and the reference sync pulse. The error signal is now called a fine adjustment speed error signal. An output of the phase comparator 23 is connected to the change-over switch 16 in place of the phase comparator 12 in FIG. 1.

The other structure is similar to that of FIG. 1 except that the maximum inversion interval detector 8, phase comparator 12, and oscillator 13 are not provided.

In the structure, when the maximum inversion interval is detected by the maximum inversion interval detector 21 from the values each of which is in turn supplied from the decoder 6, the maximum inversion interval signal indicative of the time duration of the maximum inversion interval is generated and is compared with the reference value signal generated from the reference value generator 11 in the comparator 10. The level difference between the maximum inversion interval signal and the reference value signal is the coarse adjustment speed error signal. This signal is supplied from the comparator 10 to the servo circuit 18 through the change-over switch 16. The servo circuit 18 adjusts the control voltage so that the level of the coarse adjustment speed error signal is equal to 0 and supplies it to the driving circuit 20. The driving circuit 20 drives so as to increase the rotational speed of the spindle motor 2 when the control voltage is higher than 0V and to decrease the rotational speed of the spindle motor 2 when the control voltage is less than 0V. The rotational speed of the spindle motor 2 is consequently controlled by the feedback path including the maximum inversion interval detector 21 and comparator 10 in the initial state.

The phase of the sync detection pulse generated from the sync detector 22 is compared with that of the reference sync pulse generated from the oscillator 24 in the phase comparator 23. The fine adjustment speed error signal as a result of the phase comparison is supplied to the change-over switch 16. In the initial state just after the start of the rotation of the spindle motor 2, however, since the rotational speed of the spindle motor 2 is controlled in accordance with the coarse adjustment speed error signal generated from the comparator 10, the fine adjustment speed error signal is not used.

After the start of the rotation of the spindle motor 2, when the rotation of the spindle motor 2 is stabilized, the coarse adjustment speed error signal level decreases. When the coarse adjustment speed error signal level lies within a first predetermined value, a lock signal is generated from the lock detector 14. The change-over switch 16 is switched so as to relay the fine adjustment speed error signal from the comparator 23 in place of the coarse adjustment speed error signal in accordance with the lock signal. The fine adjustment speed error signal is supplied to the servo circuit 18. The servo circuit 18 adjusts the control voltage so that the level of the fine adjustment speed error signal is equal to 0 and supplies it to the driving circuit 20 of the spindle motor 2. The rotational speed of the spindle motor 2 is, consequently, controlled at a high precision by the feedback path including the sync detector 22 and comparator 23 in the generating state of the lock signal.

Figure 6:
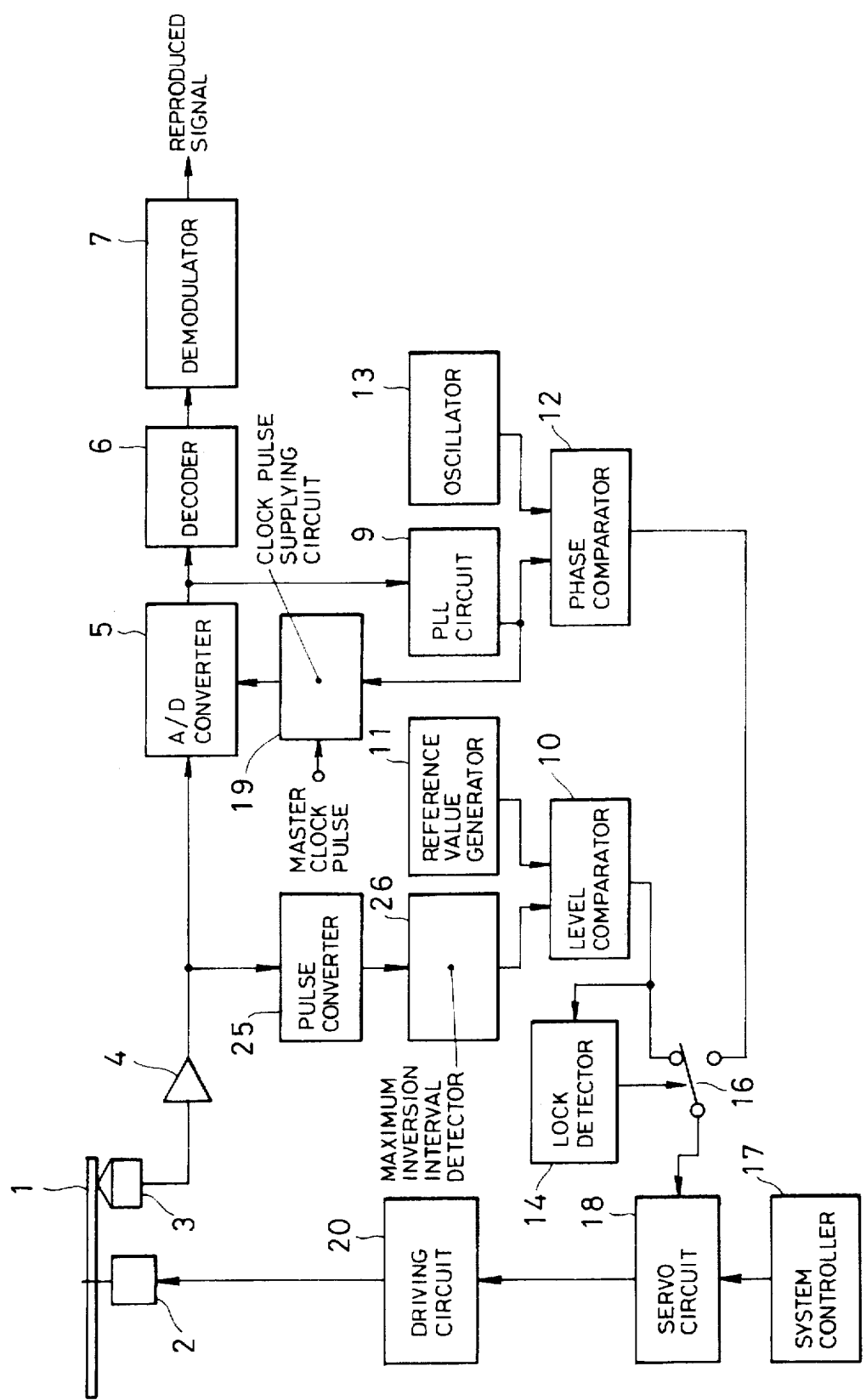
FIG. 6 is a diagram showing the third embodiment of the invention.

FIG. 6 shows another embodiment of the invention. In this embodiment, portions similar to those in the structure shown in FIG. 1 are designated by the same reference numerals. A maximum inversion interval detector 26 is connected to the output of the RF amplifier 4 through a pulse converter 25. The pulse converter 25 converts the analog read signal supplied from the RF amplifier 4 into a binary signal on the basis of a predetermined threshold value. The maximum inversion interval detector 26 detects a maximum inversion interval from the binary signal. That is, since the read signal is converted to a value shown by "0" or "1" in the pulse converter 25, a continuation period of "0" or a continuation period of "1" is counted as a time duration by using a time counter (not shown) and the maximum value is held and generated. The output is reset after the elapse of a predetermined period. An output signal of the maximum inversion interval detector 26 is supplied to the comparator 10. The maximum inversion interval signal is compared with the reference value signal generated from the reference value generator 11 in the comparator 10.

The other structure of FIG. 6 is similar to that of FIG. 1. Since the operation is also almost similar to that of FIG. 1 or 5, its description is omitted here.

Figure 7:
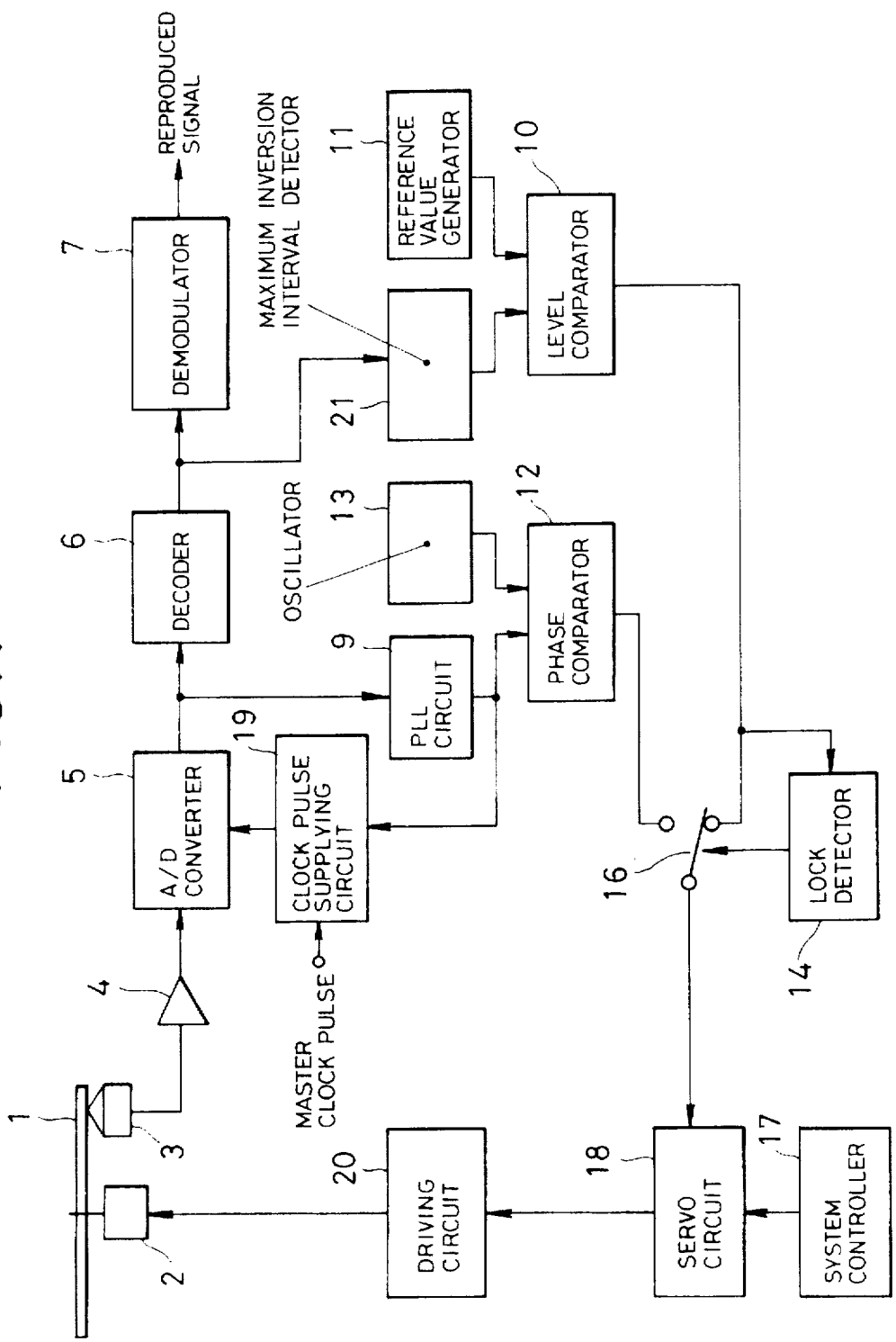
FIG. 7 is a diagram showing the fourth embodiment of the invention.

FIG. 7 further shows another embodiment of the invention. This embodiment is realized by combining a portion comprising the maximum inversion interval detector 26, comparator 10, and reference value generator 11 in FIG. 5 with the structure of FIG. 1. With this structure as well, the rotational speed of the spindle motor 2 can be controlled in accordance with the coarse adjustment speed error signal or the fine adjustment speed error signal in a manner similar to the above embodiments.

Although the player for playing an optical disk such as a CD recorded by the continuous servo method has been mentioned in the above embodiments, the invention can be also applied to a player for playing an optical disk recorded by a sampled servo method.

Figure 8:
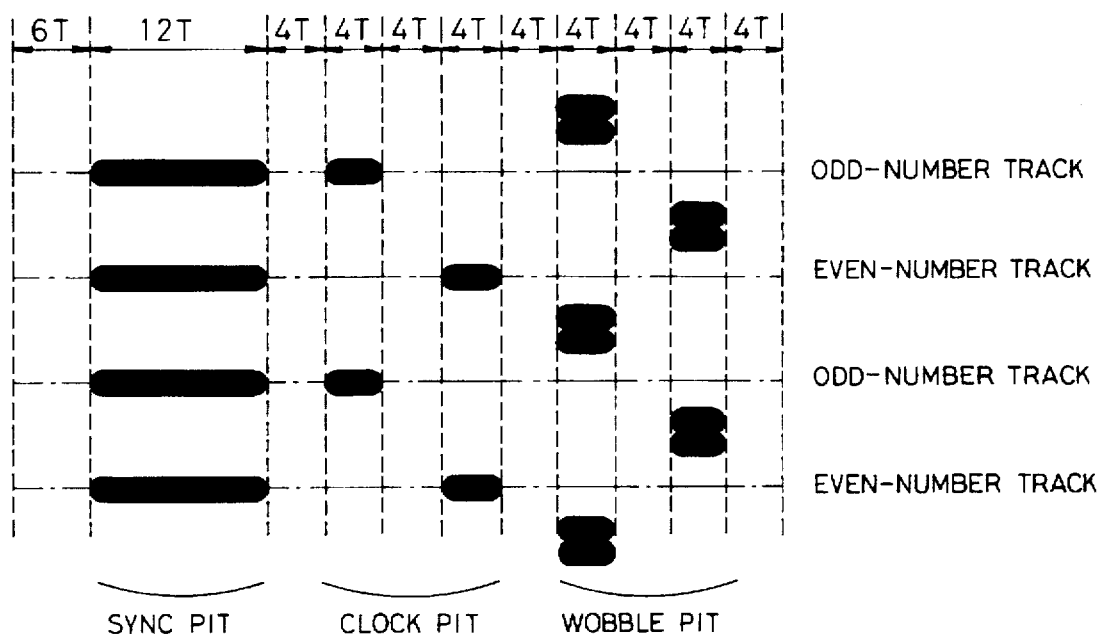
FIG. 8 is a diagram showing a pit train in a servo area of an optical disk.

A servo area and a data area are formed in each track of the optical disk onto which signals have been recorded by the sampled servo method. The data area follows the servo area. The servo and data areas are repeated every frame. The servo area is formed, for instance, in the order of a sync pit for generating a sync signal, a clock pit for generating a clock signal, and two wobble pits for generating a tracking signal as shown in FIG. 8. An arrangement of the clock pit and wobble pits in an odd-number track is different from that in an even-number track. That is, although the clock pit is 4 T away from the rear edge of the sync pit having a pit length of 12 T in the odd-number track, the clock pit is 12 T away from the rear edge of the sync pit in the even-number track. "T" is a pit length per bit. Although the wobble pits are 20 T and 28 T away from the rear edge of the sync pit in both of the odd-number and even-number tracks, the deviating directions in the disk radial direction from the track center are different in the odd-number track and even-number track.

In a playback of the optical disk having the servo area, it is sufficient that the maximum inversion interval detector detects the maximum inversion interval from the sync pit and the PLL circuit generates the clock pulse from the sample value corresponding to the clock pit. The coarse adjustment speed error signal and the fine coarse adjustment speed error signal can be consequently obtained in a manner similar to the above embodiments.

Although one of the coarse adjustment speed error signal and fine adjustment speed error signal is selectively used by the change-over switch 16 in the above embodiments, it is also possible to add those signals at a proper gain and, after that, to supply the added signal to the servo circuit.

In the optical disk player of the invention, the analog read signal generated from the pickup is converted to the digital read signal comprising a plurality of bits in the A/D converting means synchronously with the sampling clock. The digital read signal is converted to the decoded data in the decoding means. The error signal according to the difference between the actual rotational speed of the optical disk and the specified speed is generated on the basis of the digital read signal supplied from the A/D converting means or the decoded data generated from the decoding means. The rotational speed of the spindle motor is controlled in accordance with the error signal. Since the error signal is obtained from the digital sample value of the analog read signal or the value obtained by converting the digital sample value into the binary signal, therefore, even when the optical disk has the signal recorded thereon at a high density, the rotational speed can be controlled to the specified speed at a high precision.

What is claimed is:

1. An optical disk player for reading data recorded on an optical disk and obtaining a reproduced signal, comprising:
   a spindle motor for rotating said optical disk;
   pickup means for irradiating a light beam toward a recording surface of said optical disk, receiving a light reflected from said optical disk, and generating an analog read signal according to the amount of the received light;
   A/D (Analog/Digital) converting means for converting said read signal to a digital read signal consisting of a plurality of bits in synchronism with a sampling clock;

decoding means for decoding said digital read signal and generating decoded data;

error signal generating means for generating a coarse adjustment speed error signal and a fine adjustment speed error signal according to the difference between an actual rotational speed of said optical disk and a specified speed on the basis of said digital read signal;

a switch for alternately relaying only one of said coarse adjustment speed error signal and said fine adjustment speed error signal; and means for controlling a rotational speed of said spindle motor in accordance with the error signal relayed.

2. An optical disk player according to claim 1, and further comprising a lock detector for generating a lock signal when a level of said coarse adjustment speed error signal is below a predetermined level.

3. An optical disk player according to claim 2, wherein said switch is operated to relay said fine adjustment speed error signal when said lock signal is generated.

4. An optical disk player according to claim 1, wherein a pit train in which a maximum value of an inversion interval is limited is recorded in a recording track of said optical disk, and said error signal generating means comprises a maximum inversion interval detector for detecting a time duration of the maximum inversion interval, a reference value generator for generating a reference time duration, and a level comparator for generating said coarse adjustment speed error signal based on a difference between the time duration of the maximum inversion interval and the reference time duration.

5. An optical disk player according to claim 1, wherein a pit train in which a maximum value of an inversion interval is limited is recorded in a recording track of said optical disk, and said error signal generating means comprises a phase-locked loop circuit for generating a clock pulse having a phase which is synchronized with rotation of said optical disk from said digital read signal, an oscillator for generating a reference clock pulse, and a phase comparator for generating said fine adjustment speed error signal based on a difference between the clock pulse having the phase synchronized with optical disk rotation and the reference clock pulse.

6. An optical disk player for reading data recorded on an optical disk and obtaining a reproduced signal, and a pit train in which a maximum value of an inversion interval is recorded in a recording track of said optical disk, comprising:

a spindle motor for rotating said optical disk;

pickup means for irradiating a light beam toward a recording surface of said optical disk, receiving a light reflected from said optical disk, and generating an analog read signal according to the amount of the received light;

A/D (Analog/Digital) converting means for converting said read signal to a digital read signal consisting of a plurality of bits in synchronism with a sampling clock;

decoding means for decoding said digital read signal and generating decoded data;

means for detecting a time duration of the maximum inversion interval in accordance with said digital read signal generated from said A/D converting means;

means for generating a coarse adjustment speed error signal according to a difference between the time duration of said maximum inversion interval and a reference value; and means for controlling a rotational speed of said spindle motor in accordance with said coarse adjustment speed error signal.

7. An optical disk player for reading data recorded on an optical disk and obtaining a reproduced signal, comprising:

a spindle motor for rotating said optical disk;

pickup means for irradiating a light beam toward a recording surface of said optical disk, receiving a light reflected from said optical disk, and generating an analog read signal according to the amount of the received light;

A/D (Analog/Digital) converting means for converting said read signal to a digital read signal consisting of a plurality of bits in synchronism with a sampling clock;

decoding means for decoding said digital read signal and generating decoded data;

PLL (Phase-Locked Loop) means for generating a clock pulse having a phase which is synchronized with rotation of said optical disk from said digital read signal;

means for generating a fine adjustment speed error signal according to a phase difference between said clock pulse and a reference clock pulse; and means for controlling a rotational speed of said spindle motor in accordance with said fine adjustment speed error signal.

8. An optical disk player for reading data recorded on an optical disk and obtaining a reproduced signal, comprising:

a spindle motor for rotating said optical disk;

pickup means for irradiating a light beam toward a recording surface of said optical disk, receiving a light reflected from said optical disk and generating an analog read signal according to the amount of the received light;

A/D (Analog/Digital) converting means for converting said read signal to a digital read signal consisting of a plurality of bits in synchronism with a sampling clock;

decoding means for decoding said digital read signal and generating decoded data;

error signal generating means for generating an error signal according to the difference between an actual rotational speed of said optical disk and a specified speed on the basis of said digital read signal; and means for controlling a rotational speed of said spindle motor in accordance with said error signal;

wherein a pit train in which a maximum value of an inversion interval is limited is recorded in a recording track of said optical disk, and said error signal generating means comprises:

means for detecting a time duration of the maximum inversion interval in accordance with said digital read signal generated from said A/D converting means;

means for generating a coarse adjustment speed error signal according to the difference between the time duration of said maximum inversion interval and a reference value;

PLL (Phase-Locked Loop) means for generating a clock pulse of which phase is synchronized with the rotation of said optical disk from said digital read signal;

means for generating a fine adjustment speed error signal according to the phase difference between said clock pulse and a reference clock pulse; and means for controlling the rotational speed of said spindle motor in accordance with said coarse adjustment speed error signal and said fine adjustment speed error signal.

* * * * *